UNITED STATES PATENT OFFICE.

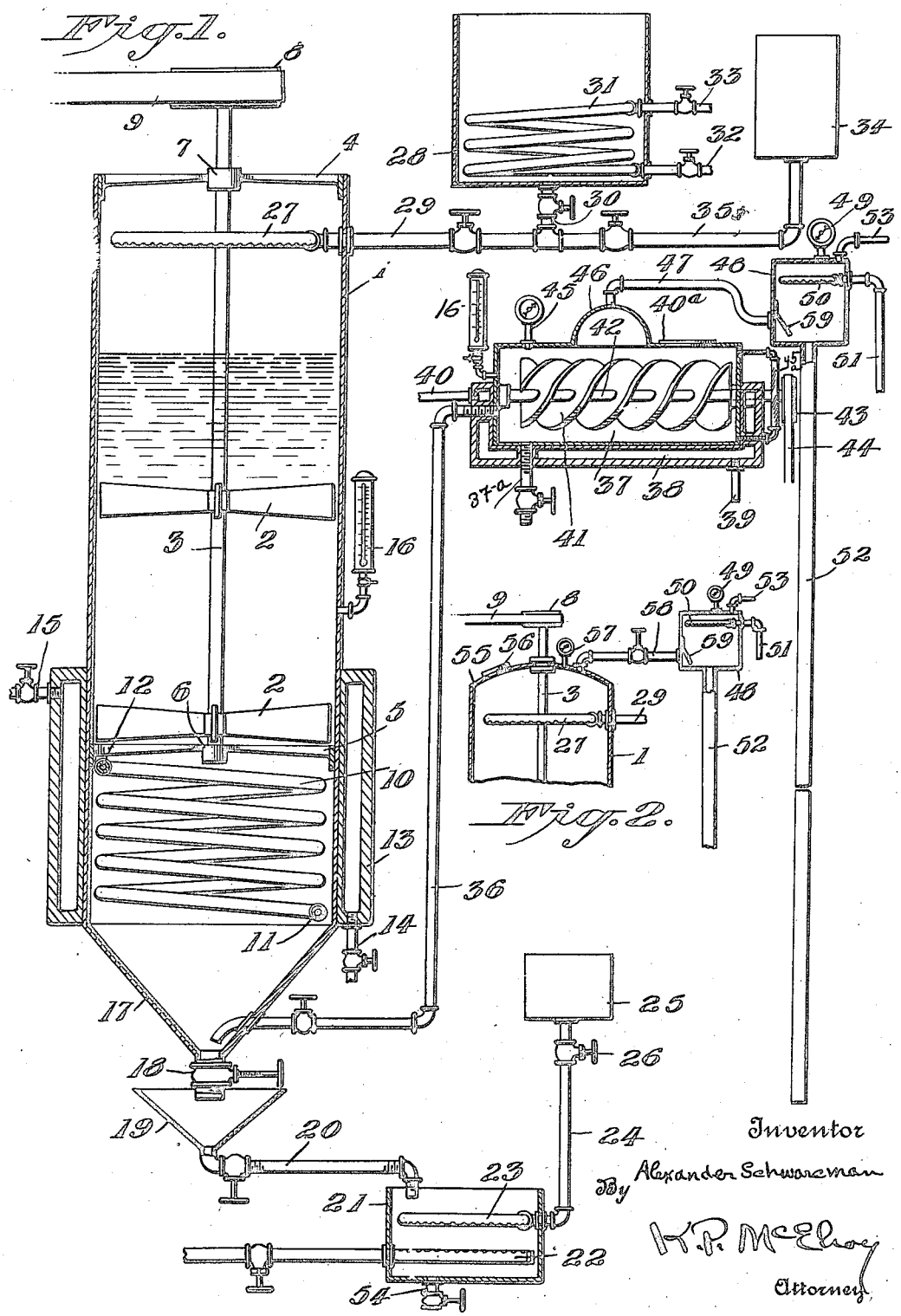

ALEXANDER SCHWARCMAN, OF BUFFALO, NEW YORK, ASSIGNOR TO SPENCER KELLOGG & SONS, INC., OF BUFFALO, NEW YORK, A CORPORATION OF NEW YORK.

PROCESS OF TREATING OILS.

1,372,631. Specification of Letters Patent. Patented Mar. 22, 1921.

Application filed February 19, 1920. Serial No. 359,928.

*To all whom it may concern:*

Be it known that I, ALEXANDER SCHWARCMAN, a citizen of the United States, residing at Buffalo, in the county of Erie and State of New York, have invented certain new and useful Improvements in the Processes of Treating Oils, of which the following is a specification.

This invention relates to processes of treating oils; and it comprises a method of purifying oils, particularly adapted to linseed oil and to the production of varnish oils therefrom, wherein the oil is treated with a little caustic soda and thoroughly agitated to produce union of, or reaction by, such soda with and on the acid and other alkali-sensitive constituents of such oil, is thereafter washed with water at or about the boiling temperature, is allowed to settle and separate to remove the water and soda, is thereafter washed with further portions of hot water until substantially neutral, is next dehydrated or freed of water by heating under high vacuum and is then treated with a little fullers' earth or other solid purifying agent, this treatment in some cases being followed by an addition of a little highly acid oil to restore the acid character of the oil; all as more fully hereinafter set forth and as claimed.

In the purification of vegetable oils a common step is a treatment with caustic soda. This soda exercises a number of functions. It combines with the free fatty acids which are almost invariably present, forming a soap therewith. In addition it has the function of rendering insoluble and separable a number of albuminoid bodies always contained in the oil and of more or less unknown nature. In part these nitrogenous matters are possibly in solution in the oil, in part, probably, in suspension. Among them are probably organic bodies of the nature of what are called enzyms. In the oily seeds are certain albuminoid bodies called enzyms, which have for their function breaking up the oils to produce free fatty acids and glycerin; something which appears to be necessary for the growth of the sprout from the seed. In the process of extracting the oil, these enzyms apparently are responsible for the stated free fatty acid; and unless the oil is treated in some way, as by the soda treatment just described, the formation of free fatty acids goes on, the oil becoming more acid with time. These albuminoid bodies are also undesirable in the oil for the reason that they are impurities and tend also to cause the oil to spoil in other ways than becoming acid (rancid). Their removal is necessary in the production of a clear bright oil of good keeping qualities. Their removal is particularly necessary from linseed oil, since impure linseed oil on heating develops a "break" due to these impurities. In the soda treatment all suspended impurities of the nature of dirt are of course carried down by the soda precipitate and the operation has a general clarifying function. Some little of the soda soap however is apt to remain dissolved or emulsified in the oil and cause trouble in subsequent use.

After the soda treatment, two general methods of procedure for removing the soda, etc., are in use in the art. One is to simply settle out the soap and separate it as "foots." The objection to this is that the "foots" invariably carry down large amounts of oil which must be afterward recovered therefrom by a separate operation and when so recovered is always of lowered grade. In simply settling out the soap and soda, the mechanical loss of oil is very great. Sometimes the settling out is assisted by the addition of salt water or the like; the salt of the solution helping to make a separation. Another method much used in the art in order to avoid these losses of oil, is to add a little hydrochloric acid after the soda treatment and separation is complete. This breaks up the soda soaps and prevents the emulsifying action of the soda so that the aqueous liquid separates out clearly, carrying out with it most of the mechanical dirt and the albuminoids which have been separated. The fatty acids set free by the hydrochloric acid go back into solution in the oil. This method, while avoiding the great loss in volume of oil incident to the first method, has the disadvantage of not giving as good and clean a product.

I have found that all the elaboration of these prior methods in dealing with the soda separation are unnecessary; and that a good and clean separation and purification of oil, without the loss of oil incident to the one method and imperfect purification due to the other method, may be secured by the simple expedient of first treating the oil with a little concentrated caustic soda solution in the cold under vigorous agitation and then diluting out or washing out with hot water. The amount of caustic soda used is about that which would correspond to the free acids present in the oil. With most linseed oils, from 3 to 5 per cent. of a 14 to 25° Baumé caustic soda solution is required. Agitation is continued until the oil shows a break; that is, until there is a visible separation of solid matters. The alkalized oil will not settle in the cold in any reasonable time and when settled hot the amount of neutral oil carried down in the foots is, as stated, very great. However, if, after producing reaction with soda, the oil is raised in temperature to about 180° F. and then a small amount of hot water, say about 5 per cent., sprayed into it, there is then a good separation. Agitation is stopped during the addition. The soda and soap solutions in the oil are diluted and the watery liquid reaching the bottom separates out cleanly and perfectly. The water not only removes all the aqueous soda solution and soap solution from the oil, but frees the oil of dissolved soda soaps. After adding water in this way, the oil is then further washed in the same manner with further portions of hot water until it is neutral. The amount of water needed is not great. Usually five or six washings, using five or six per cent. of water each time, will suffice, except with unusually low grade oils, when more may be needed.

The watery liquid separated from the alkalized oil is substantially a water solution of the soda soaps of the free fatty acids of the oil, carrying more or less suspended coagulated albuminoids, dirt, etc., from which such solution may be readily separated by decantation or filtration. The solution may be directly used in soap making, or it may be broken up by any suitable acid, such as sulfuric acid, setting free the fatty acids as an acid oil which may be used for soap making or other purposes. There is very little loss of neutral oil from the body of oil under treatment in the present process; usually the amount carried away is not greater than that of the fatty acids which are removed. The acid oil separated from acids rarely contains more than half its weight of neutral oil.

After the described washing the oil is of course wet, and it is necessary to remove the contained water. I effect drying by evaporation from extended surfaces of the oil in a vacuum chamber; advantageously using heat and a rather high vacuum. This high vacuum may be produced in any of the ways known in the art, such as the employment of a barometric column with spray condenser and accessory air pump. After dehydration, the oil may next be agitated with a little fullers' earth, boneblack or other suitable decolorant or purifying agent. It is now a clear permanent neutral oil.

While I regard my method as applicable to any vegetable oil, such as cocoanut oil, cottonseed oil, rape oil, etc., I find that it is more particularly applicable to the drying oils, such as linseed oil, nut oil, etc. It is particularly useful in making very high grade "varnish oils" from raw linseed oil.

In making varnish oils from raw linseed oil there are a number of specific products which are commercially made. For one such oil the requirements are that it shall be very clear or limpid, shall be neutral in character, and shall not exhibit a break (separation of solid matter) on heating to a high temperature. Such an oil is directly given by the process just described when applied to raw linseed oil. Another high grade varnish oil desired for a number of purposes must also be clear and limpid and be likewise able to withstand heating to a high temperature but should be of a somewhat acid nature; that is, should contain free fatty acids derived from linseed oil. Such an oil may be made from the material just described by an expedient which consists in finally adding to such oil a small proportion of a linseed oil which has been treated for clarification with free sulfuric acid. The amount of such acid-treated oil to be added of course depends on the acid number desired in the product. A little of the stated "acid oil" separated from the alkali-soap deposition may be used.

In the accompanying illustration I have shown, more or less diagrammatically and in elevation, certain parts being shown in vertical section, an apparatus adapted for the present purposes. In this showing—

Figure 1 is a diagrammatic showing of the complete apparatus partly in section and partly in elevation and Fig. 2 is a sectional segmental view of a modified form of the apparatus.

Referring to the drawings, element 1 indicates a treatment tank provided with the stirrers 2 suitably keyed to the shaft 3, journaled in the spiders 4 and 5 as at 6 and 7. The shaft is provided with a pulley 8 driven by belt 9 leading to a source of power. The contents of the tank may be heated either by internal heat supplied as steam to the closed coil 10 through the inlet 11 and removed through the exit 12 or the contents of the tank may be heated by means of external heat such as steam supplied to jacket 13 through inlet 15 and removed through exit 14. The tank is provided with thermometer 16 for the purpose of ascertaining the temperature of the oil at any stage during the treatment. The conical bottom 17 of the tank 1 is provided with a valved draw-off pipe 18 by which contents of the tank may be delivered to funnel 19. The use of a funnel in this connection has the advantage that in a later drawing off of the oil, the oil may be inspected from time to time by allowing samples to run into the funnel. The funnel is provided with valved pipe 20 leading to a second treating tank 21 for receiving aqueous soap solutions. This tank is provided with a perforated steam pipe 22 for the purpose of blowing steam into the contents and is further provided with the spray 23 in communication with a pipe 24 leading to tank 25 containing sulfuric or other acid. Pipe 24 is suitably valved as at 26 for controlling the supply of acid to the tank.

The treating tank is provided with water spray 27 arranged to direct water in a finely divided form substantially over the entire top surface of the oil in the tank. The spray is in communication with heated water in tank 28 by means of the valved pipes 29 and 30. The water in the tank 28 is heated to about the boiling point by means of closed steam in coil 31, steam being supplied at 33 and removed at 32.

Tank 34 for caustic alkali solution is also in communication with the spray 27 through pipes 29 and 35. When it is desired to supply alkali to the oil the valve on pipe 30 is closed and the valves on pipes 29 and 35 are opened. When it is desired to supply hot water to the spraying means 27 and thus to the oil, the valves on pipes 29 and 30 are opened and the valve on pipe 35 is closed.

For removing oil from the tank after the alkali treatment and washing, a valved pipe 36 is provided in direct communication with vacuum drier 37. This drier is provided with a jacket 38 to which steam may be admitted at 40 and exhausted at 39. The jacket may merely surround the lower half of the vacuum drier. The drier is further provided with internal stirrer 41 shown as a spiral or screw having shaft 42 with suitable pulley 43 and driving belt 44 leading to a source of power (not shown). This type of stirrer serves to film out the oil and assist in the drying operation. The vacuum drier is provided with the usual gage 45 and has a dome 46 with off-take pipe 47 leading to the barometric condenser 48. The provision of the dome permits removal of water from the oil in the vacuum drier at a high point away from possible foam and the like. The driers are provided with thermometer 16.

The barometric condenser is provided with vacuum gage 49, with the usual water spraying means 50 supplied through pipe 51 and with the usual water leg 52. Uncondensed gases may be removed by suitable suction means (not shown) through pipe 53. Baffle plate 59 covers the vapor entrance.

In the modified form of apparatus shown in Fig. 2, the main treatment tank (1) is also used for the subsequent treating under vacuum. The apparatus is therefore directly provided with vacuum connections. As shown, the apparatus carries cover 55 having manhole 56 for supplying oil to be treated. The stirrer is journaled through this cover. The apparatus is also provided in this modification with vacuum gage 57 and vacuum pipe 58 in direct communication with a barometric condenser (48).

The water for diluting and washing should not contain acids or salts to interfere with its functioning. As it is supplied, it rains down into and through the agitated oil, combining with the aqueous suspension which the oil holds to dilute the drops thereof and produce a solution which will settle cleanly. On stopping the stirrer the solution accumulates at the bottom and may be drawn off through 18 and sent to tank 21. More hot water is now added in the same way for washing purposes, the washings drawn off and so on until the oil is neutral. These washings are also sent to the tank 21. In tank 21 the liquid may be allowed to settle, and the sludge drawn off through pipe 54. The aqueous liquid may then be withdrawn and used for soap, etc.; or it may be acidified in the tank. For this purpose its temperature is raised by blowing in steam at 22 and acid is added from tank 25 by 26, 24 and 23. This results in the separation of acid oil as a floating layer.

With the apparatus of Fig. 1 after completion of the washing, the wet oil is drawn through pipe 36 to the vacuum apparatus 37 wherein it is agitated and caused to expose constantly changing surfaces by the slowly rotating screw 41. The evaporation causes cooling but this is compensated for by heat from jacket 38. The evolved vapors are condensed in a barometric condenser with the production of vacuum in a well understood way. After the oil is dried which may be told by observation of the liquid in gage glass 45$^a$ or by vapor line 47 becoming cool, it is next treated with a little fullers' earth or the like introduced through manhole 40$^a$ and is withdrawn at outlet 37$^a$. It is now a pure varnish oil of neutral character. If acid varnish oil is desired it may receive an acid addition in the way previously described.

What I claim is:—

1. The process of purifying vegetable oils which comprises agitating a body of such an oil with strong caustic soda solution in about the amount corresponding to the free fatty acids present, raising the temperature of the oil to about 180° F., passing hot water thereinto and therethrough in finely divided form and removing the solution at the bottom.

2. The process of purifying vegetable oils which comprises agitating a body of such an oil with strong caustic soda solution in about the amount corresponding to the free fatty acids present, raising the temperature of the oil to about 180° F., passing hot water thereinto and therethrough in finely divided form and removing the diluted solution at the bottom and washing with further portions of hot water in the same way until substantial neutrality is attained.

3. The process of purifying vegetable oils which comprises agitating a body of such an oil with strong caustic soda solution in about the amount corresponding to the free fatty acids present, raising the temperature of the oil to about 180° F., passing hot water thereinto and therethrough in finely divided form and removing the diluted solution at the bottom, washing with further portions of hot water in the same way until substantial neutrality is attained and drying the washed oil in vacuo under heating conditions.

4. The process of purifying vegetable oils which comprises agitating a body of such an oil with strong caustic soda solution in about the amount corresponding to the free fatty acids present, raising the temperature of the oil to about 180° F., passing hot water thereinto and therethrough in finely divided form and removing the diluted solution at the bottom, washing with further portions of hot water in the same way until substantial neutrality is attained, drying the washed oil in vacuo under heating conditions and finally agitating with pulverulent decolorizing agents.

5. In the manufacture of acid varnish oil from raw linseed oil, the process which comprises agitating such oil with a strong caustic soda solution in about the amount equivalent to the free fatty acids present, raising the heat of the oil and incorporating a small amount of hot water as a diluting agent, removing the diluted solution at the bottom, washing with hot water to about neutrality, drying the oil in vacuo under heat, decolorizing by agitating with a pulverulent decolorizing agent, separating this agent and finally adding a little oil of acid nature.

6. In the production of varnish oils from linseed oil, the process which comprises agitating linseed oil with caustic soda in amount sufficient to neutralize the free fatty acids present, separating the soda compounds and washing the oil, drying the oil and adding a little highly acid oil to restore acidity to such oil.

In testimony whereof, I affix my signature.
ALEXANDER SCHWARCMAN.